UNITED STATES PATENT OFFICE.

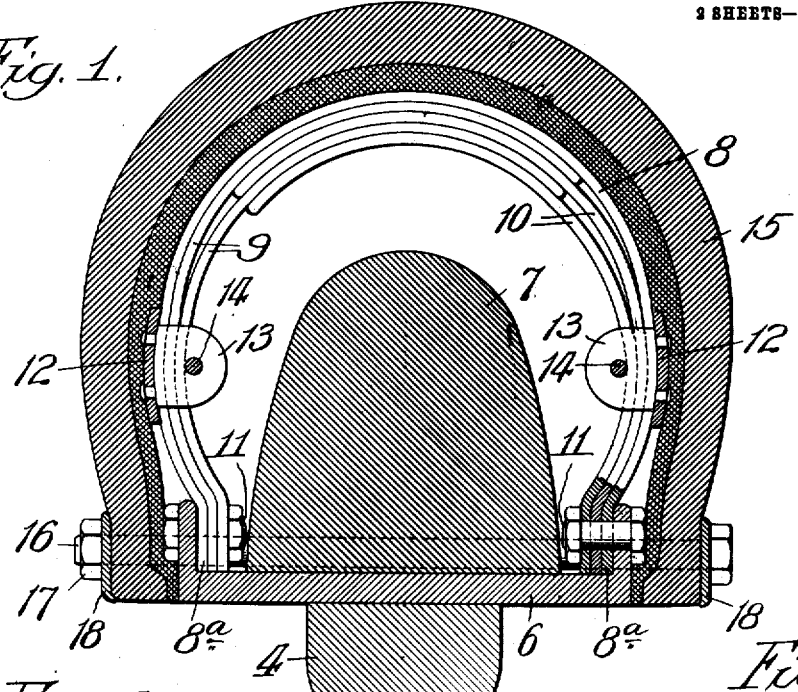
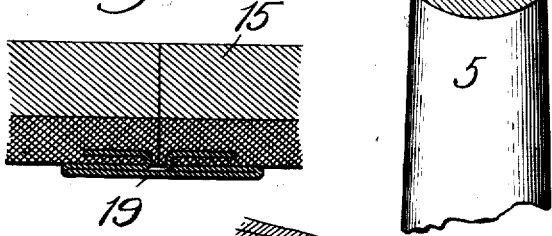
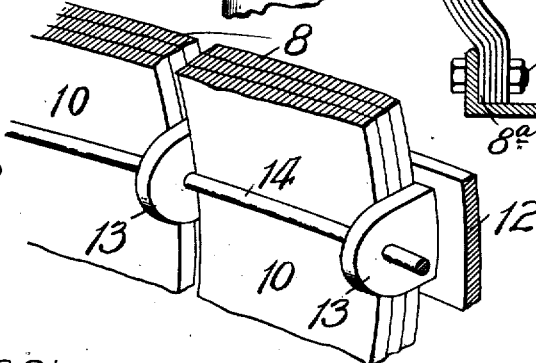
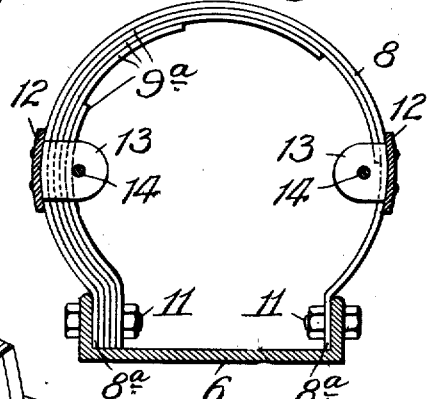
J. F. WILMOT.
VEHICLE TIRE.
APPLICATION FILED AUG. 27, 1906.
909,978. Patented Jan. 19, 1909.
2 SHEETS—SHEET 1.
Witnesses:
Inventor:
John F. Wilmot,

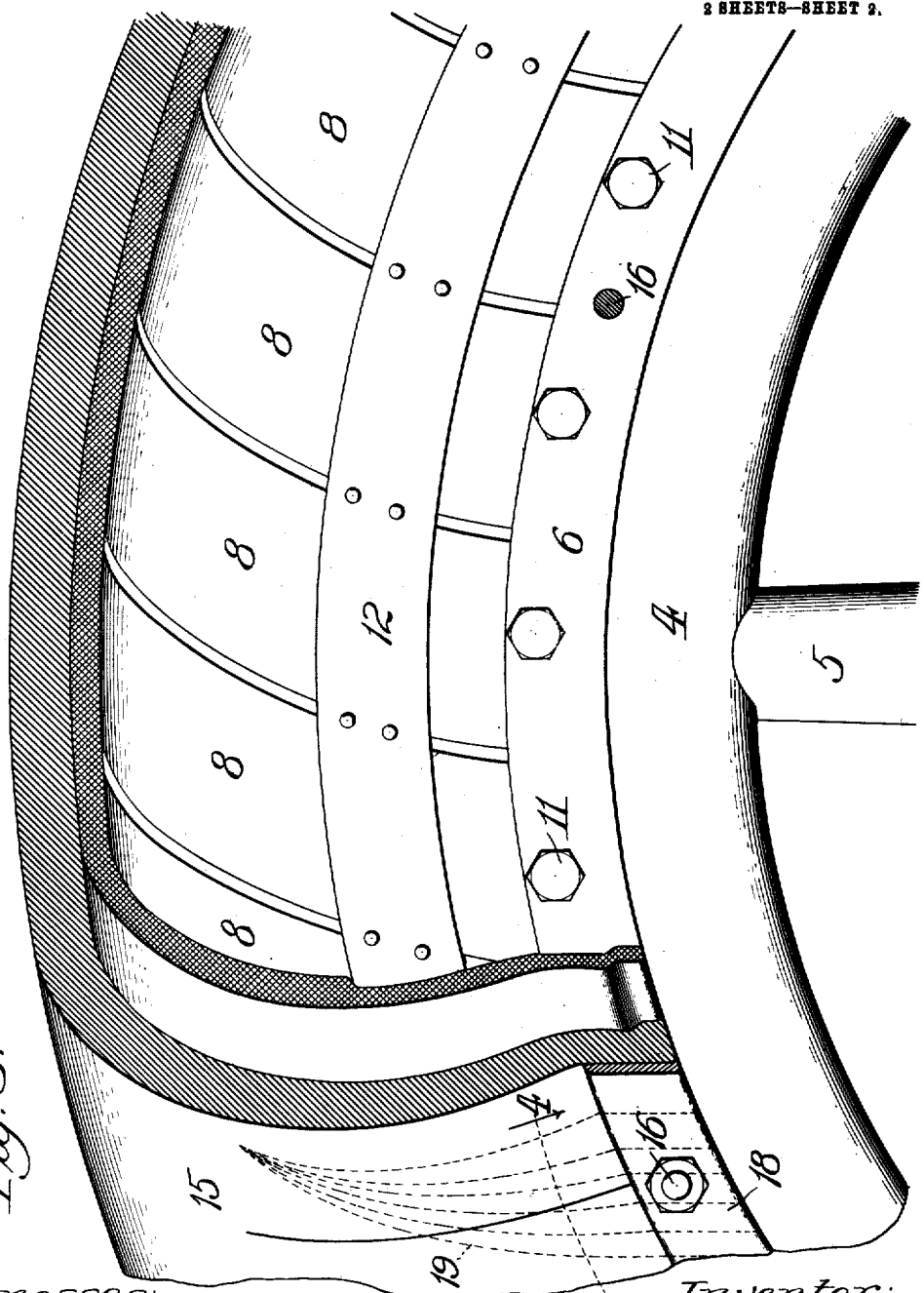

JOHN F. WILMOT, OF DETROIT, MICHIGAN.

VEHICLE-TIRE.

No. 909,978.	Specification of Letters Patent.	Patented Jan. 19, 1909.

Application filed August 27, 1906. Serial No. 332,123.

*To all whom it may concern:*

Be it known that I, JOHN F. WILMOT, a citizen of the United States, residing at Detroit, in the county of Wayne and State of Michigan, have invented a new and useful Improvement in Vehicle-Tires, of which the following is a specification.

The object of my invention is to provide a novel construction of "rubber" tire, whereby it shall possess the quality of strength and that of resiliency throughout its tread-portion, and particularly at the points of contact with obstructions in its path, and at the same time be puncture-proof, in the sense of remaining unimpaired, as to function, by puncturing.

Referring to the accompanying drawings—Figure 1 is a broken view, showing my improved tire in cross-sectional elevation; Fig. 2, a broken perspective view showing details of the spring-construction; Fig. 3, a broken view of the tire in side elevation, representing a portion of the canvas-lined rubber cover removed to display the preferred diagonal disposition of the springs, and showing by dotted representation one of a number of folds in a side of the cover; Fig. 4, a section taken at the line 4 on Fig. 3 and viewed in the direction of the arrow; and Fig. 5, an edge view of a spring-set, showing a modified construction.

At 4 is represented the felly of a wheel and one of the spokes is shown at 5. A channel-steel rim 6 surrounds the felly and has confined about it, centrally, a solid-rubber or other cushion 7 preferably of the shape illustrated. Similar sets or bunches of springs are provided in series about the wheel, at suitable intervals, say of one-eighth of an inch, apart (though they may overlap one another at their tread-portions without departure from my invention), to extend transversely or, and preferably as shown in Fig. 3, diagonally across the rim, each set comprising, as its preferred construction, an outer leaf-spring 8 of the bowed shape illustrated between its perforated straight ends 8ᵃ, and a plurality of shorter bowed leaf-springs 9, 10, each having a straight perforated end like the ends 8ᵃ of the outer spring, and extending from opposite sides of the rim in overlapping relation, with their free ends reaching past the center of the tire-tread. Each spring-set is represented as composed of two of the springs 9 fastened at their straight ends, with one end 8ᵃ of the spring 8, to the rim 6 by a bolt 11 passed through one of the rim-flanges, and two of the springs 10 similarly fastened by a bolt 11 passing through the other rim-flange and the adjacent ends of the springs 8 and 10. Thus in each spring-set the bowed springs 9 and 10 extend in opposite directions across the rim and overlap each other at their free ends, which reach past the circumferential center of the wheel. The spring-sets in the circumferential series thereof are elastically connected together at each side of the tire by an annular spring-metal band 12 provided at intervals with inwardly-projecting perforated ears 13, which may be riveted to the band, as shown, and which embrace the members of the spring-sets at their edge-portions; and a thin steel rod 14 passes through each circumferential series of the ears 13 to extend about the inner surfaces of the annular series of spring-sets. These bands, with the rod-connected ears, keep the spring-sets properly spaced and permit each set to be removed independently of the other sets; and they furthermore serve to reinforce the spring-sets and maintain them in upright condition.

An annular cover 15, which may be the usual canvas-lined rubber sheath of the pneumatic tire, envelops the spring-sets and fits about its edges against the outer sides of the rim 6, to which it is fastened, as by bolts 16 passed, at suitable intervals, through the edge-portions of the cover, through the rim-flanges and transversely through the base-portion of the cushion 7 to fasten it in place. The heads and nuts 17 on the bolt 16 bear against continuous or sectional rings 18 interposed between them and the respectively adjacent edge-portions of the cover 15, and afford a species of binding for the said edge-portions of the cover 15, as well as washers.

The described construction renders the tire highly resilient throughout, since the spring-sets are strong and elastic, the members 9 and 10 supplementing each other and also the continuous outer spring 8, in resilient action, although the spring 8 may be omitted without departure from my invention; and it is not essential, moreover, that it shall, if used, be elastic, for it may be a mere yielding retaining-band for the inner springs. The resilient action of the tire is rendered such, by the construction involving the individual spring-sets in the circumferential series thereof, that any indentation produced in the tread-portion by its encountering an obstruction in its path, will be confined to the point of contact and not be distributed over any great proportion of the tread-surface, so that the recoil of the tire, in clearing the obstruction by being localized, will be the more sudden and forcible. When, as may occur, the pressure against the tire is so great as to force the spring-sets against the cushion, the latter affords an elastically yielding bearing to supplement the springs in their rebounding action. Moreover, the means provided for maintaining the spring-sets in upright condition perform the additional function, owing to the elasticity of the rings 12 and rods 14, of supplementing the resilient action of the spring-sets; and the construction, besides, renders the tire puncture-proof and very durable. Where the spring-sets are arranged to extend diagonally, as preferred, the advantage is afforded of increasing the area of contact thereof with the ground.

To adapt the annular cover 15 to be readily drawn over the series of spring-sets for applying and removing it, I render its inner side extensible by providing it there, at intervals of six inches, more or less, apart, with sections of thin folding material, preferably relatively thin rubber. One of these folding sections is shown in Fig. 4 and by dotted representation in Fig. 3, in the form of an insert 19 between severed ends of the canvas-lined structure, formed of the relatively thin material in the shape of a gusset having its lateral edges cemented or otherwise fastened to the adjacent ends of the severed canvas lining and folding upon itself against the inner surface of said lining. These insertions render the cover extensible about the side thereof provided with them, whereby in applying or removing the cover it may be readily expanded over the bowed spring-sets; and when so applied, each insert may be readily tucked or folded upon itself into the condition represented in Fig. 4. The bolts 16 and washer-bands 18 secure the inserts in their folded condition to prevent loosening of the cover when in place by expansion of its insert-equipped side.

In the modified construction illustrated in Fig. 5, the inner bowed springs, of varying lengths, within the band 8, and which are denoted by 9ª, are fastened to one side only of the rim to extend with their free ends one overlapping the other toward the opposite side of the rim. This construction forms a desirable embodiment of my invention, and may involve a greater number than represented of the springs 9ª, or a lesser number.

What I claim as new, and desire to secure by Letters Patent, is—

1. In a vehicle-tire, the combination of a wheel-rim, a circumferential series of spring-sets, each comprising an outer yielding retaining band fastened at its ends to opposite sides of the rim, and inner bowed springs fastened to the rim to extend with their free ends reaching partway across it, and a cover enveloping the spring-sets.

2. In a vehicle-tire, the combination of a wheel-rim, a circumferential series of spring-sets each comprising an outer yielding retaining band fastened at its ends to opposite sides of the rim, and a plurality of inner bowed springs of different lengths fastened to the rim to extend one upon the other with their free ends reaching partway across it, and a cover enveloping the spring-sets.

3. In a vehicle-tire, the combination of a wheel-rim, a circumferential series of spring-sets, each comprising an outer yielding retaining bowed leaf-spring fastened at its ends to opposite sides of the rim, and an inner bowed leaf-spring fastened at one end to a side of the rim to extend with its free end past the circumferential center of the tire-tread, and a cover enveloping the spring-sets.

4. In a vehicle-tire, the combination of a wheel-rim, a circumferential series of spring-sets, each comprising bowed springs fastened to the rim to extend therefrom in relatively opposite directions and one over the other in overlapping relation with their free ends reaching past the circumferential center of the tire-tread, and a cover enveloping the spring-sets.

5. In a vehicle-tire, the combination of a wheel-rim, a circumferential series of spring-sets, each comprising an outer yielding retaining band secured at its ends to opposite sides of the rim, and inner bowed springs fastened to the rim to extend therefrom in relatively opposite directions and one over the other in overlapping relation with their ends reaching past the circumferential center of the tire-tread, and a cover enveloping the spring-sets.

6. In a vehicle-tire, the combination of a wheel-rim, a circumferential series of spring-sets, each comprising an outer bowed spring secured at its ends to opposite sides of the rim, and inner bowed springs fastened to the rim to extend therefrom in relatively opposite directions and one over the other in overlapping relation with their ends reaching past the circumferential center of the tire-tread, and a cover enveloping the spring-sets.

7. In a vehicle-tire, the combination of a wheel-rim, a circumferential series of diagonally extending spring-sets, each comprising bowed springs fastened to the rim to extend therefrom in relatively opposite directions and one over the other in overlapping relation with their free ends reaching past the circumferential center of the tire-tread, and a cover enveloping the spring-sets.

8. In a vehicle-tire, the combination of a wheel-rim, a circumferential series of diagonally-extending spring sets, each comprising an outer bowed spring secured at its ends to opposite sides of the rim, and inner bowed springs fastened to the rim to extend therefrom in relatively opposite directions and one over the other in overlapping relation with their free ends reaching past the circumferential center of the tire-tread, and a cover enveloping the spring-sets.

9. In a vehicle-tire, the combination of a wheel-rim, a circumferential series of spring-sets, each comprising a plurality of bowed springs secured at opposite sides of the rim to extend one over the other across it, elastic means on each side of the series of spring-sets for resiliently supporting them in upright condition, and a cover enveloping the spring-sets.

10. In a vehicle-tire, the combination of a wheel-rim, a circumferential series of spring-sets, each comprising bowed springs fastened to the rim to extend therefrom in relatively opposite directions and one over the other in overlapping relation with their free ends reaching past the circumferential center of the tire-tread, elastic reinforcing means on each side of the series of spring-sets, and a cover enveloping the spring-sets.

11. In a vehicle-tire, the combination of a wheel-rim, a circumferential series of spring-sets, each comprising an outer bowed spring secured at its ends to opposite sides of the rim, and inner bowed springs fastened to the rim to extend therefrom in relatively opposite directions and one over the other in overlapping relation with their free ends reaching past the circumferential center of the tire-tread, elastic reinforcing means on each side of the series of spring-sets, and a cover enveloping the spring-sets.

12. In a vehicle-tire, the combination of a wheel-rim, a circumferential series of spring-sets, each comprising a plurality of bowed springs secured at opposite sides of the rim to extend across it, members of each set extending in relatively opposite directions and one over the other in overlapping relation with their free ends reaching past the circumferential center of the tire-tread, annular metal bands extending about the outer sides of said series of spring-sets and each provided at intervals with perforated spacing-ears extending between the spring-sets and having an annular rod passing through and connecting them, and a cover enveloping the spring-sets.

13. In a vehicle-tire, the combination of a channel-shaped wheel-rim, a circumferential series of spring-sets, each comprising an outer bowed spring extending from flange to flange of said rim, and inner bowed springs extending in relatively opposite directions one over the other from the opposite flanges of said rim and in overlapping relation with their free ends reaching past the circumferential center of the tire-tread, bolts passing through the rim-flanges and through the flatwise abutting ends of the springs of each set to secure it, independently of the other spring-sets, to the rim, and a cover enveloping said spring-sets.

14. In a vehicle-tire, the combination of a channel-shaped wheel-rim, a circumferential series of spring-sets, each comprising an outer bowed spring extending from flange to flange of said rim, and inner bowed springs extending in relatively opposite directions one over the other from the opposite rim-flanges and in overlapping relation with their free ends reaching past the circumferential center of the tire-tread, bolts passing through the rim-flanges and through the flatwise abutting ends of the springs of each set to secure it to the rim, a rubber cover enveloping said spring-sets, and bolts passing at intervals between said sets through the edge-portions of the cover and rim to fasten the cover in place.

15. In a vehicle-tire, the combination of a channel-shaped wheel-rim, a cushion surrounding said rim, a circumferential series of spring-sets, each comprising an outer bowed spring extending from flange to flange of said rim and inner bowed springs extending in relatively opposite directions one over the other from the opposite rim-flanges and in overlapping relation with their free ends reaching past the circumferential center of the tire-tread, bolts passing through the rim-flanges and through the flatwise abutting ends of the springs of each set to secure it to the rim, a rubber cover enveloping said spring-sets, and bolts passing at intervals between said sets through the edge-portions of the cover and through the rim-flanges and cushion.

16. A vehicle-tire, comprising, in combination, a channel-shaped wheel-rim, a cushion surrounding said rim, a circumferential series of spring-sets, each comprising a plurality of bowed springs bolted at their ends to the rim-flanges to extend across said cushion, annular spring-metal bands about the outer sides of said spring-sets, provided with inwardly projecting perforated ears extending between said sets and an annular metal rod on the inner side of each spring-set passing through the respective series of ears to connect them together, a rubber cover enveloping said spring-sets, and bolts passing at intervals between said sets through the edge-portions of the cover and through the rim-flanges and cushion.

17. In a vehicle-tire, the combination of a wheel-rim, a circumferential resilient cushion on said rim, a cover enveloping said cushion and provided with slits at intervals in its sides folding inserts secured to each side of the slits, and means for securing the cover in place.

18. In a vehicle-tire, the combination of a wheel-rim, a circumferential series of spring-sets, each comprising a plurality of bowed springs secured at opposite sides of the rim to extend one over the other across it, and a cover enveloping said spring-sets provided at intervals about one side with folding inserts, for the purpose set forth.

19. In a vehicle-tire, the combination of a wheel-rim, a circumferential series of spring-sets, each comprising a plurality of bowed springs secured at opposite sides of the rim to extend one over the other across it, and a cover of canvas-lined rubber removably secured in place to envelop said spring-sets and provided at intervals about one side with folding gusset-shaped inserts of relatively thin material, for the purpose set forth.

JOHN F. WILMOT.

In presence of—
L. HEISLAR,
J. H. LANDES.